June 5, 1923.
D. B. BRADNER
PROCESS OF MAKING PHOSGENE
Filed Jan. 11, 1922
1,457,493
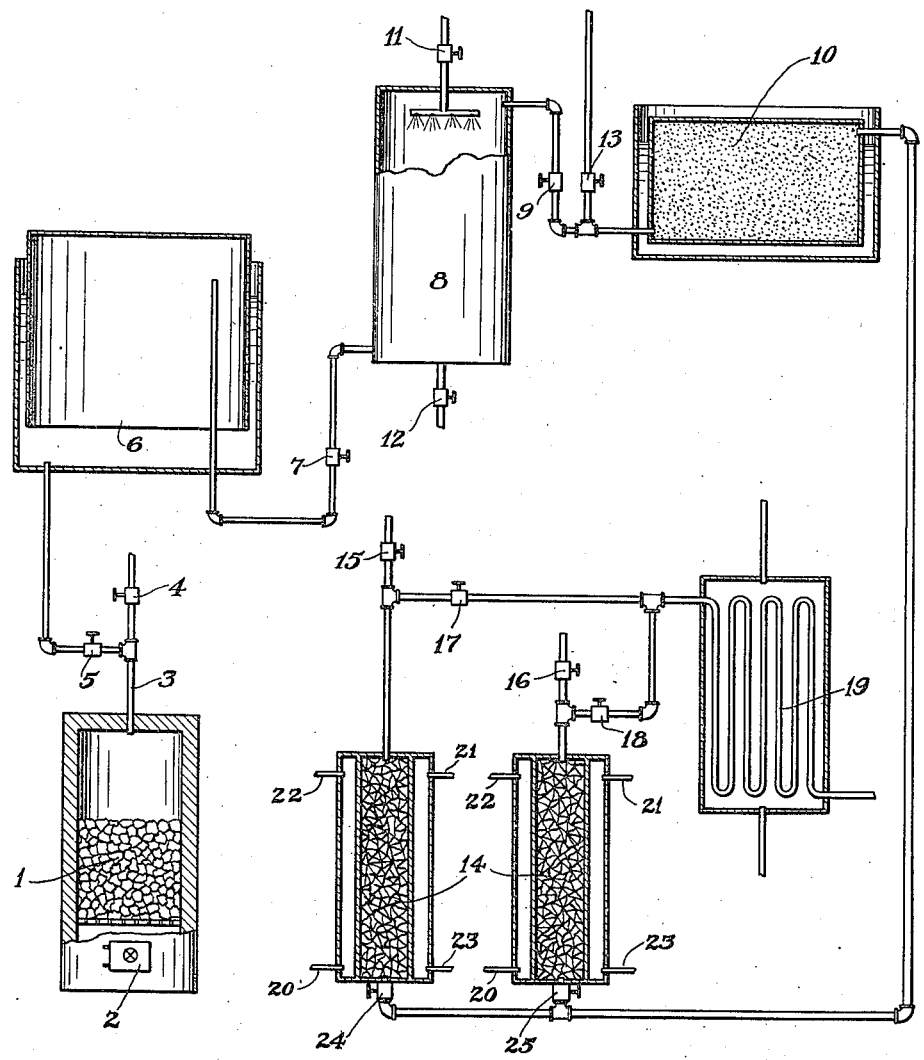

UNITED STATES PATENT OFFICE.

DONALD B. BRADNER, OF EDGEWOOD, MARYLAND.

PROCESS OF MAKING PHOSGENE.

Application filed January 11, 1922. Serial No. 528,551.

*To all whom it may concern:*

Be it known that I, DONALD B. BRADNER, a citizen of the United States, residing at Edgewood, Maryland, in the county of Harford and State of Maryland, have invented certain new and useful Improvements in the Processes of Making Phosgene, of which the following is a specification.

This invention relates to the production of phosgene and more specifically to a new process for making this substance.

Among the objects of this invention is the production of phosgene by a simpler and more efficient method than heretofore used. A further object of this invention comprises the production of phosgene under conditions whereby the yield approaches the theoretical quantity.

In prior processes for making phosgene, chlorine was allowed to react with CO in the presence of a suitable catalyst, such as charcoal. The reaction is as follows:

$$Cl_2 + CO = COCl_2$$

By refrigeration, the phosgene produced was reduced to a liquid.

The chief difficulty in this old process is due to the fact that it necessitates the use of CO in a very concentrated and substantially pure condition. One of the common methods of obtaining this CO consisted in first burning coke with an excess of air to form $CO_2$ which was removed from the other flue gases by a solution of $K_2CO_3$. The $KHCO_3$ solution which resulted was then heated, the bicarbonate being decomposed with the liberation of $CO_2$ and the reformation of $K_2CO_3$. The $CO_2$ was then mixed with oxygen (usually obtained by fractional separation from liquid air) and passed through a bed of heated coke, thereby forming substantially pure CO. The reaction $$CO_2 + C = 2CO$$

is endothermic while the reaction $$O_2 + 2C = 2CO$$

is exothermic. By proper control of the quantities of $CO_2$ and $O_2$ which are added the temperature can be maintained at the desired point.

In my process the carbon, in some suitable form, such as coke, is burned with an insufficient supply of air, thereby obtaining CO substantially free of $CO_2$ and oxygen, but diluted with a high percentage of nitrogen. By properly carrying out this combustion it is possible to obtain a gas containing about 34%, by volume, of CO and 66% inert gases, consisting principally of nitrogen. In actual operation, however, I usually obtain a gas of about 27% CO, 5% $CO_2$ and 68% nitrogen. It is to be understood, however, that mixtures of gases which are not so rich in CO may be used for the subsequent steps of my process; in fact, any CO present will react, the lower limit being an economic one.

The gas mixture resulting from this combustion is then preferably dried by a suitable dehydrating agent, such as sulphuric acid, and then mixed with the theoretical quantity of chlorine in the presence of a suitable catalyst, such as bone black, activated charcoal, or sunlight. The reaction takes place with the liberation of considerable heat, consequently the flow of gas should be regulated to maintain the most efficient temperature. The following table gives the percent dissociation of phosgene at different temperatures:

| Temperature degrees C. | Percentage dissociation. |
|---|---|
| 100 | 0.0 |
| 150 | 0.2 |
| 200 | 0.8 |
| 250 | 2.6 |
| 300 | 6.0 |
| 350 | 13.2 |
| 400 | 27.9 |
| 450 | 44.6 |
| 500 | 62.8 |
| 550 | 77.0 |
| 600 | 87.2 |
| 650 | 92.8 |
| 700 | 96.2 |
| 750 | 98.2 |
| 800 | Practically complete. |

The higher the temperature, the more rapidly this equilibrium is reached. Consequently a high initial temperature and a low finishing temperature will give the maximum capacity plus the highest percent conversion. I prefer to have the reaction take place at temperatures of 200–400° C.

The gas, after leaving the reactor, is passed through a chamber filled with adsorbing material, such as silica gel, activated charcoal, etc. The adsorbent takes up the phosgene and removes same from the inert gases, such as nitrogen, carbon dioxide, etc., which pass off either as waste gases or may be collected for use where nitrogen free from oxygen is desired. The phosgene may be recovered from the adsorber either by heat, reduced pressure or both, and if liquid phosgene is desired it may be condensed by refrigeration, increased pressure, or a combination of refrigeration and higher pressure.

If silica gel is used as the adsorbing agent it is desirable to maintain same at a low temperature during the adsorption. Suitable temperatures are from 0 to 20° C., and very good results may be obtained by operating around 5 to 10° C. The adsorptive powers of the gel decrease with temperature, so it is better to carry out the adsorption at low temperatures for best results.

In the accompanying drawing there is illustrated, diagrammatically, an arrangement of apparatus for carrying out my process. Coke is burned in the combustion chamber #1, air being supplied at #2. The products of combustion pass out through the conduit #3 and by manipulation of the valves #4 and #5, these gases may either pass out into the air or else on to the gas holder #6. From this gas holder these combustion gases are conducted through valve #7 to a suitable drying tower #8 containing sulphuric acid or other suitable drying agent and the dried gases are then conducted through the valve #9 to reactor #10. The sulphuric acid enters through the valve #11 and the spent acid may be withdrawn through the valve #12. Chlorine gas is also supplied to the reactor #10 through the valve #13 from a suitable source of chlorine. This reactor #10 contains the catalytic material. The chlorine combines with the CO of the dried combustion gases while in the reactor #10, and phosgene is produced thereby. The phosgene and the residual gases are swept from the reactor by the current of gas on to the adsorbers #14 containing a suitable adsorbing agent, as above described. The phosgene is thus taken up with the adsorbent and the inert gases pass from the adsorbers and out through the valves #15 and #16, the valves #17 and #18 being closed. The valves #15 and #16 are then closed and the valves #17 and #18 are opened and the phosgene is evolved from the adsorbent material and passes out through the valves #17 and #18 to a suitable condenser #19.

The adsorbers, #14, are jacketed and during adsorption when it is desired to cool the adsorbent, cooling fluid may enter at #20 and leave at #21. During the recovery step of the phosgene from the adsorbent, heating fluid may be supplied to the jacket at #22, and withdrawn, together with such portion as is condensed, at #23.

If it is desired to produce a vacuum in the adsorbers #14, the valves #24 and #25 are closed and the adsorbers exhausted.

This process may be carried out either continuously or intermittently. When continuous operation is desirable it is advisable to have a battery of adsorbing chambers, so that when adsorption is taking place in one chamber, the adsorbed phosgene may be recovered from another chamber, and the latter revivified for subsequent use.

The present invention is not limited to the specific details as set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making phosgene, treating chlorine with a mixture of CO highly diluted by inert gas and then subjecting the gaseous product to the action of an adsorbent for removing the phosgene from the other gases.

2. In a process of making phosgene, treating chlorine with a mixture of CO highly diluted by inert gas and then subjecting the gaseous product to the action of silica gel at temperatures of 0 to 20° C.

3. In a process of making phosgene, treating chlorine with a mixture of CO highly diluted by inert gas, subjecting the gaseous product to the action of an adsorbent for removing the phosgene from the other gases, volatilizing the phosgene from the adsorbent and then liquefying the evolved phosgene.

4. In a process of making phosgene, treating with chlorine in the presence of a catalyzer the products resulting from burning carbon with an insufficient amount of air for complete combustion and then subjecting the resulting gaseous product to the action of an adsorbent for removing the phosgene from the other gases.

5. In a process of making phosgene, treating with chlorine in the presence of a catalyzer at temperatures of 200–400° C. the dried products resulting from burning carbon with an insufficient amount of air for complete combustion and then subjecting the resulting gaseous product to the action of silica gel at temperatures of 5–10° C.

DONALD B. BRADNER.